United States Patent [19]
Turnbull et al.

[11] Patent Number: 5,084,864
[45] Date of Patent: Jan. 28, 1992

[54] BROADBAND, INDUCTIVELY COUPLED, DUPLEX, RF TRANSMISSION SYSTEM

[75] Inventors: Thomas H. Turnbull, Everett; James B. Turner, Bothell, both of Wash.

[73] Assignee: The Boeing Company, Seattle, Wash.

[21] Appl. No.: 523,226

[22] Filed: May 14, 1990

[51] Int. Cl.$^5$ .......................... H04B 1/54; H04B 3/03
[52] U.S. Cl. ............................. 370/24; 455/3; 455/33; 455/41; 333/4; 333/5; 333/24 R; 333/24 C; 375/36
[58] Field of Search ............. 455/3, 33, 51, 41; 333/4, 5, 124, 136, 24 R, 24 C, 25, 26; 370/24, 5; 375/36

[56] References Cited

U.S. PATENT DOCUMENTS

| | | | |
|---|---|---|---|
| 1,189,317 | 4/1916 | Von Kramer | 379/55 |
| 2,394,444 | 2/1946 | Halstead | 179/6.3 |
| 2,419,833 | 4/1947 | Grimes | 179/82 |
| 2,515,663 | 7/1950 | O'Brien | 179/2.5 |
| 3,310,736 | 3/1967 | Bayly et al. | 324/62 |
| 3,975,594 | 8/1976 | Guntersdorfer | 179/15 |
| 3,999,015 | 12/1976 | Snyder et al. | 179/1 |
| 4,209,663 | 6/1980 | Sekiguchi | 455/3 |
| 4,411,004 | 10/1983 | Graham | 375/36 |
| 4,428,078 | 1/1984 | Kuo | 455/3 |
| 4,528,677 | 7/1985 | Ise et al. | 375/36 |
| 4,584,707 | 4/1986 | Goldberg et al. | 455/41 |
| 4,736,452 | 4/1988 | Daniels et al. | 455/41 |
| 4,747,158 | 5/1988 | Goldberg et al. | 455/11 |
| 4,833,337 | 5/1989 | Owens et al. | 455/41 |
| 4,835,604 | 5/1989 | Kondo et al. | 358/86 |

FOREIGN PATENT DOCUMENTS 56-16331 2/1981 Japan.
56-16332 2/1981 Japan.
57-11546 1/1982 Japan.

Primary Examiner—Douglas W. Olms
Assistant Examiner—T. Ghebretinsae
Attorney, Agent, or Firm—Christensen, O'Connor, Johnson & Kindness

[57] ABSTRACT

A broadband, inductively coupled, duplex, radio frequency (RF) transmission system for communcating between a central unit (10) and a plurality of remote units (31) is disclosed. The central unit (10) includes an RF signal source (11) and an RF receiver (21) connected to one end of a balanced transmission line (25) via a signal splitter (15) and a transmission line impedance matching network (27). Each remote unit (31) includes a receiving section (33) and a transmitting section (35) separate from one another. Each receiving section (33) and each transmitting section (35) includes U-shaped couplers (37,43) positioned so as to overlie the balanced transmission line (25). The U-shaped couplers (37,43) are oriented such that the cross-members of the U-shaped couplers (37,43) lie orthogonal to the balanced transmission line (25) and the legs of the U-shaped couplers (37,43) lie parallel to the balanced transmission line (25). The legs of the U-shaped couplers (37,43) are connected to electronic transmit and receive system RF receivers and Rf signal sources (41,47), via impedance matching networks (39,45).

22 Claims, 3 Drawing Sheets

BROADBAND, INDUCTIVELY COUPLED, DUPLEX, RF TRANSMISSION SYSTEM

TECHNICAL AREA

This invention relates to transmission systems and, more importantly, to inductively coupled ratio frequency transmission systems.

BACKGROUND OF THE INVENTION

When ordering commercial aircraft, airline companies often specify a number of design options to the manufacturer, including passenger seating layouts. The manufacturing and inventory costs associated with providing different seating arrangements and spacing between seats can be significant. These costs will become more important to the next generation of aircraft, which will offer new personal entertainment and service facilities to each passenger. Designers of such facilities are planning to install an entertainment system and passenger service system in the back of each aircraft seat for use by the passenger in the following seat. In order to communicate with these facilities, conventional wiring techniques typically require that each different seating arrangement that an airline company specifies have a different length communication lead harness. The costs and weight penalty associated with providing communication for each seat using conventional wiring techniques is likely to be unacceptable to most passenger carriers. In addition to unacceptable costs in terms of weight, conventional wiring techniques inhibit the ability to rearrange classes of seating (by sliding seats to change seating pitch) in order to maximize the payload return on a flight (even within thirty minutes of departure). The ability to rearrange classes of seating on a short-term basis is a profitable feature that is desired by most airlines.

An alternative to wiring each seat to a central communication source utilizing a conventional wire lead harness is disclosed in commonly assigned U.S. Pat. No. 4,428,078 (C. Kuo). This patent discloses what is referred to therein as a "wireless" system for communicating with a plurality of multiple-turn coupler coils disposed in the base of seats throughout an aircraft cabin. Perhaps this technology could more accurately be described as a "connectorless" transmission system, because communication signals are inductively coupled from a transmission line that is disposed in the floor of an aircraft cabin to coupler coils attached to each seat group. The communication signals are used to communicate with the passenger entertainment and service systems installed in the seats. This wireless system permits seats to be moved about in different arrangements as required by individual airlines, without concern for providing different length interconnecting wire harnesses.

In order for a connectorless communication system to be practical in an aircraft environment, the system must meet certain criteria. First, the system must be broadband, i.e., operate over a relatively broad bandwidth. Second, the system must be duplex, i.e., have the capability of transmitting and receiving in both directions from a central unit to a plurality of remote (seat) units. Further, the system must be highly efficient, low in weight, and highly reliable.

The development of higher quality entertainment and services for aircraft passengers creates the broad bandwidth requirement. Present and future aircraft entertainment systems provide video as well as audio entertainment. Video entertainment requires 6 MHz per channel and contemporary FM stereo requires 200 KHz per channel. Service data transmission requires a bandwidth of 100 KHz per 50 K bit/second channel. Duplex communication is required because it is necessary to be able to establish two-way communication between the seats of an aircraft and central control equipment in order for a passenger to initiate action, such as tuning on a TV mounted in the seat in front of the passenger, and the action to occur.

High efficiency is required because it is necessary to communicate broadband RF signals throughout an aircraft cabin without interfering with other electronic equipment such as the navigational equipment and computer systems of the aircraft. It is also necessary that the system operate with minimal interference from outside sources. More specifically, conventional RF transmitting systems use a high-powered signal to excite an antenna. Transmitter power is proportional to the square of the distance between the transmitting antenna and the receiving antenna. The use of high power creates a potential interference problem with other electronic systems that operate in the same area. Conversely, a broadband receiving antenna tends to pick up interfering signals generated by other signal sources. Thus, to be practical a system for use onboard an aircraft must operate with minimal power and have a minimal tendency to pick up interference from external sources.

The present invention is directed to providing a highly efficient, broadband, inductively coupled, duplex, RF transmission system suitable for use in the passenger compartment of aircraft to communicate between a central unit and a plurality of remote seat units.

SUMMARY OF THE INVENTION

In accordance with this invention, a broadband, inductively coupled, duplex, radio frequency (RF) transmission system suitable for communicating between a central unit and a plurality of remote units is disclosed. The central unit includes an RF signal source and an RF receiver connected to one end of a balanced transmission line via a signal splitter and a transmission line impedance matching network. Each remote unit includes a receiving section and a transmitting section separate from one another. Each receiving section and each transmitting section includes a U-shaped coupler positioned so as to overlie the balanced transmission line, in close proximity thereto. The U-shaped couplers are oriented such that the cross-members of the U-shaped couplers lie orthogonal to the balanced transmission line and the legs of the U-shaped couplers lie parallel to the balanced transmission line. The legs of the U-shaped couplers are connected to electronic transmit and receive systems, i.e., RF receivers and RF signal sources, via receive and transmit loop impedance matching networks, respectively. Because the U-shaped couplers are located in close proximity to the balanced transmission line, tight signal coupling exists between the couplers and the transmission line.

High efficiency results from the tight signal coupling between the couplers and the balanced transmission line. The balanced configuration of the transmission line minimizes the effect of interfering radio frequency signals from outside sources and maintains the quality of the transmitted and received entertainment and service signals high. High efficiency allows the radio frequency fields radiating from the system to be of relatively low intensity, causing minimal radio interference with other electronic equipment. More specifically, the total radio frequency power needed to transmit signals over a broadband, inductively coupled, duplex RF transmission system formed in accordance with the invention is much lower than would be required by previously developed inductively coupled RF transmission systems.

BRIEF DESCRIPTION OF THE DRAWINGS

The foregoing and other features and advantages of this invention will become more readily appreciated as the same becomes better understood by reference to the following detailed description when taken in conjunction with the accompanying drawings wherein.

DETAILED DESCRIPTION OF THE PREFERRED EMBODIMENT

As will be better understood from the following description, the present invention provides a broadband, inductively coupled, duplex, radio frequency (RF) transmission system for communicating between a central unit and a plurality of remote units. The invention is ideally suited for use onboard an aircraft for communicating between a central unit that provides control, video and audio signals to a plurality of remote units installed in passenger seat groups located within the cabin of the aircraft. Radio frequency signals pass through a balanced transmission line extending between the central unit and the seat group located remote units where signals transmitted by the control unit are picked up by U-shaped couplers disposed at the base of each group of seats, above the balanced transmission line. Signals transmitted by the seat groups are applied to the balanced transmission line via separate U-shaped couplers.

Figure 1:
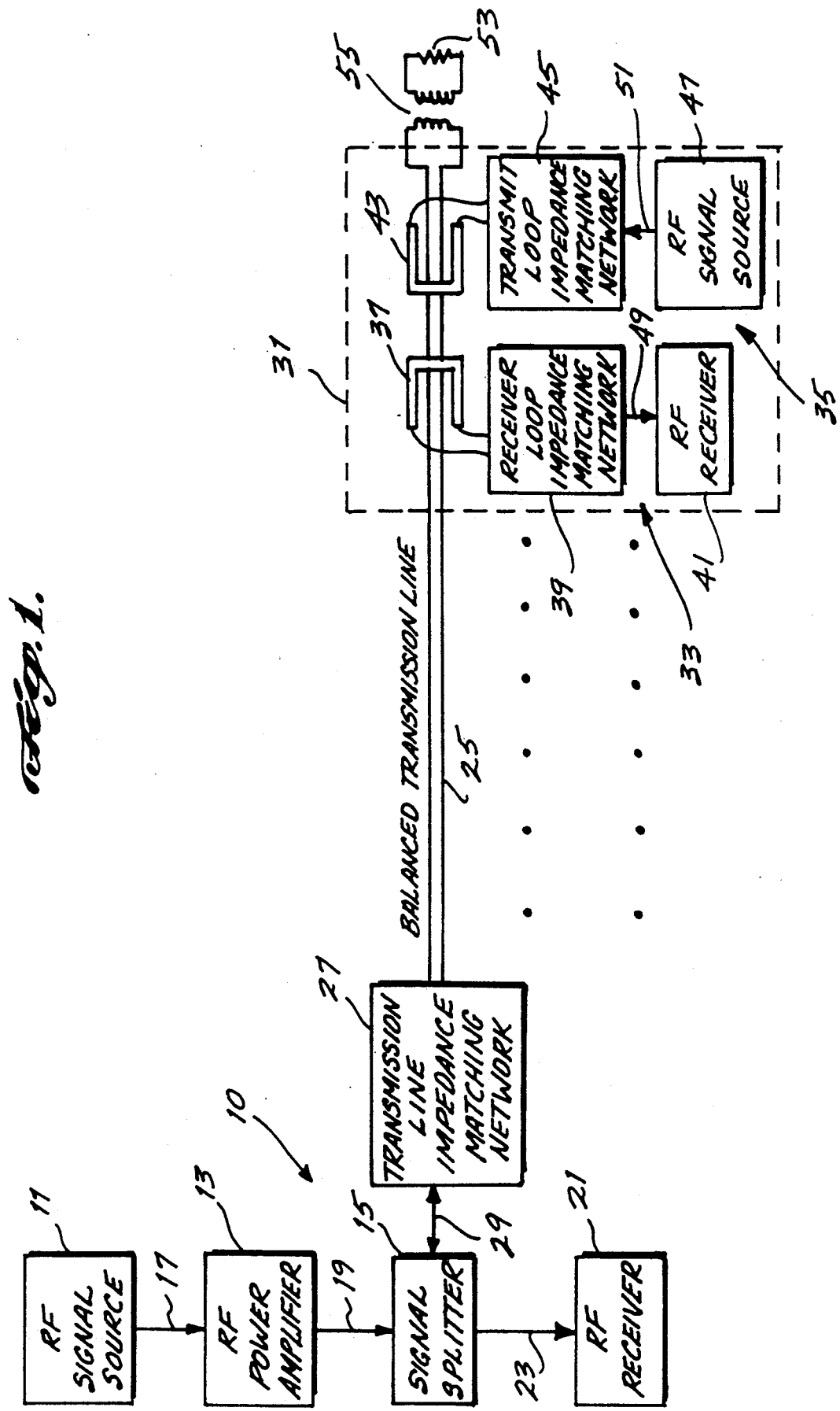
FIG. 1 is a partially block, partially pictorial diagram of a broadband, inductively coupled, duplex, RF transmission system formed in accordance with the invention.

FIG. 1 illustrates the presently preferred embodiment of a broadband, inductively coupled, duplex, radio frequency transmission system formed in accordance with the invention. More specifically, FIG. 1 illustrates a central unit 10 formed by an RF signal source 11 connected through an RF power amplifier 13 to a signal splitter 15. The RF signal source creates RF signals, preferably lying in the 40 MHz to 300 MHz band. Preferably, the cables 17 and 19 connecting the RF signal source to the RF power amplifier and the RF power amplifier 13 to the signal splitter 15, respectively, are coaxial cables. Also, preferably, the RF power amplifier 13 is a low distortion power amplifier designed to avoid creating harmonics or intermodulation products on its output that might cause interchannel interference between the channels of an entertainment and service system, or cause electromagnetic interference (EMI) with respect to the communications and avionic systems of an aircraft in which the invention is utilized. The central unit 10 also includes an RF receiver 21 connected to the signal splitter 15 via a cable 23, preferably a coaxial cable. The signal splitter 15 separates the transmitted and received signals, which are coupled to a balanced transmission line 25 through a transmission line impedance matching network 27, which also forms part of the central unit 10. Preferably, the signal splitter 15 is connected to the transmission line impedance matching network 27 by a coaxial cable 29.

The impedance matching network 27 transforms or matches the characteristic impedance of the connecting coaxial cable 29 to that of the balanced transmission line 25 in a conventional manner. For example, the transmission line impedance matching network 27 may transform or match the 75 ohm characteristic impedance of one type of standard coaxial cable to the 380 ohm impedance of a suitable balanced transmission line. In addition, the transmission line impedance matching network converts the unbalanced signal carried by the coaxial cable 29 into a balanced signal suitable for application to the balanced transmission line 25.

The balanced transmission line 25 conveys radio frequency signals between the central unit 10 and a plurality of remote units 31, only one of which is illustrated in FIG. 1. In an aircraft system incorporating the invention, the remote units 31 are located in the passenger seat groups located within the cabin of the aircraft. Each of the remote units 31 includes a receiving section 33 and a transmitting section 35. Each of the receiving sections includes a U-shaped coupler 37, a receiver loop impedance matching network 39, and an RF receiver 41. Each of the transmitting sections includes a U-shaped coupler 43, a transmit loop impedance matching network 45, and an RF signal source 47. The U-shaped couplers 37 and 43 each include a pair of parallel legs joined by cross-members. The cross-members are straight and unitarily join the legs at right angles.

The legs of the U-shaped coupler 37 of the receiver section 33 are connected to the input of the receiver loop impedance matching network. The output of the receiver loop impedance matching network 39 is connected to the RF receiver 31 via a cable 49, preferably a coaxial cable.

The output of the RF signal source 47 is connected to the input of the transmit loop impedance matching network 45 via a cable 51, preferably a coaxial cable. The output of the transmit loop impedance matching network 45 is connected to the legs of the U-shaped coupler of the transmit section 35.

In operation, signals transmitted by the RF signal source 11 of the central unit 10 and applied to the balanced transmission line 25 are detected by the U-shaped coupler 37 of the receiver section 33. The signals detected by the U-shaped coupler 37 of the receiver section 33 are applied to the RF receiver 41 of the receiver section via the receiver loop impedance matching network 39. The combination of the U-shaped coupler 37 and the receiver loop impedance matching network 39 provide an efficient, low distortion method of coupling signals from the balanced transmission line 25 to an unbalanced cable 49, which forms an unbalanced transmission line, without a physical connection between the two transmission lines.

Signals produced by the RF signal source 47 of the receive section 35 are coupled to the transmit U-shaped coupler 43 via the transmit loop impedance matching network 45. The transmit loop impedance matching network 45 impedance matches the unbalanced cable 51 that connects the RF signal source 47 to the transmit loop impedance matching network 45 to the U-shaped coupler 43. The combination of the U-shaped transmit coupler 43 and the transmit loop impedance matching network 45 provides an efficient, low distortion method of coupling signals from the unbalanced cable 51 to the balanced transmission line without the use of physical connectors. i5 The use of separate transmit and receive sections and separate transmit and receive couplers 37 and 43 provides a substantial amount of isolation between the receive and transmit sections 33 and 35. In one actual embodiment of the invention, this arrangement provided more than 30 db isolation between the receive and transmit sections. This substantial amount of isolation greatly reduces interference between the RF signal source 47 and the RF receiver 41 of each remote unit 31. It should be noted that, while illustrated as very similar, the transmit and receive sections need not have the same design. Efficiencies can be realized by optimizing the loops and their associated networks to provide only the necessary bandwidth.

Figure 2:
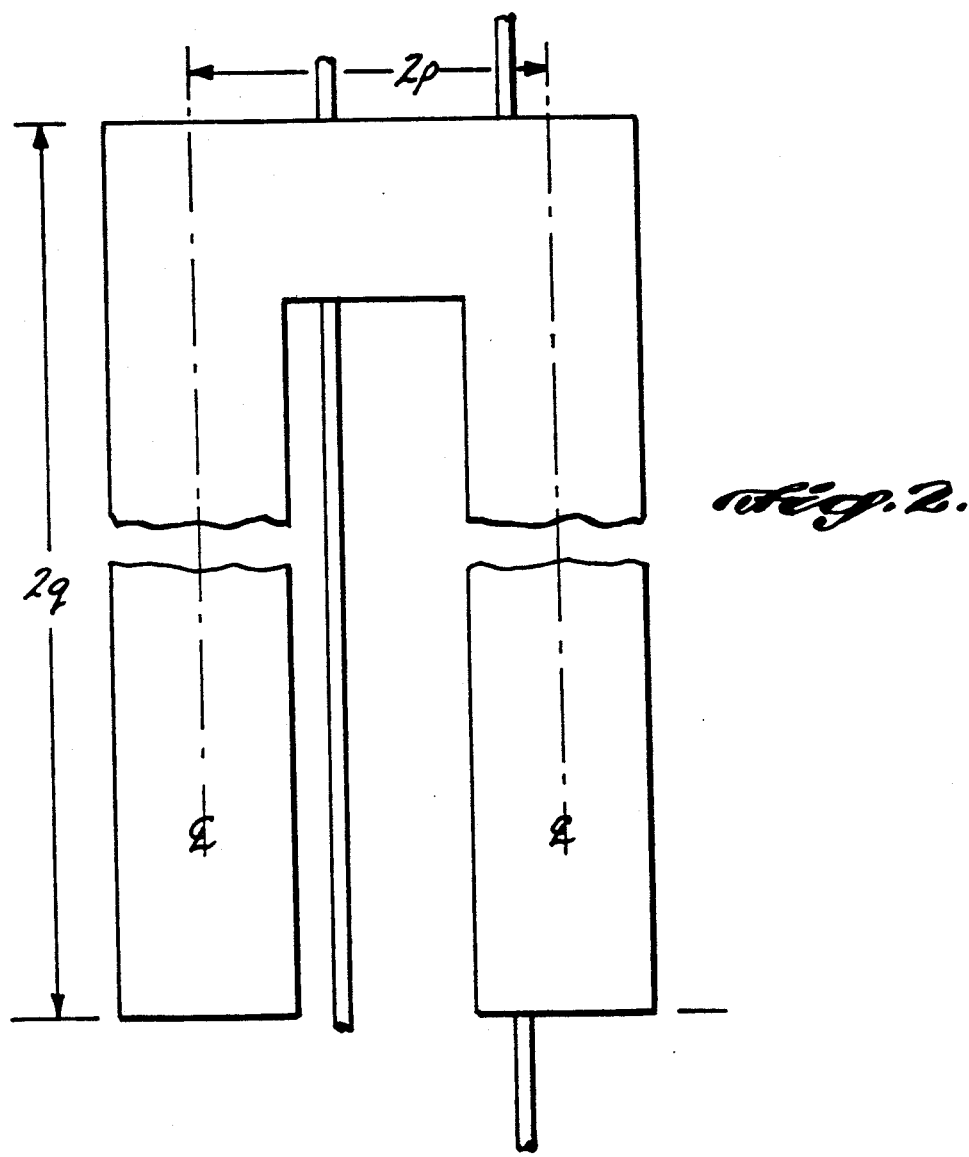
FIG. 2 is an enlarged, plan view of a U-shaped coupler positioned so as to overlie the balanced transmission line of a broadband, inductively coupled, duplex RF transmission system of the type illustrated in FIG. 1.
Figure 3:
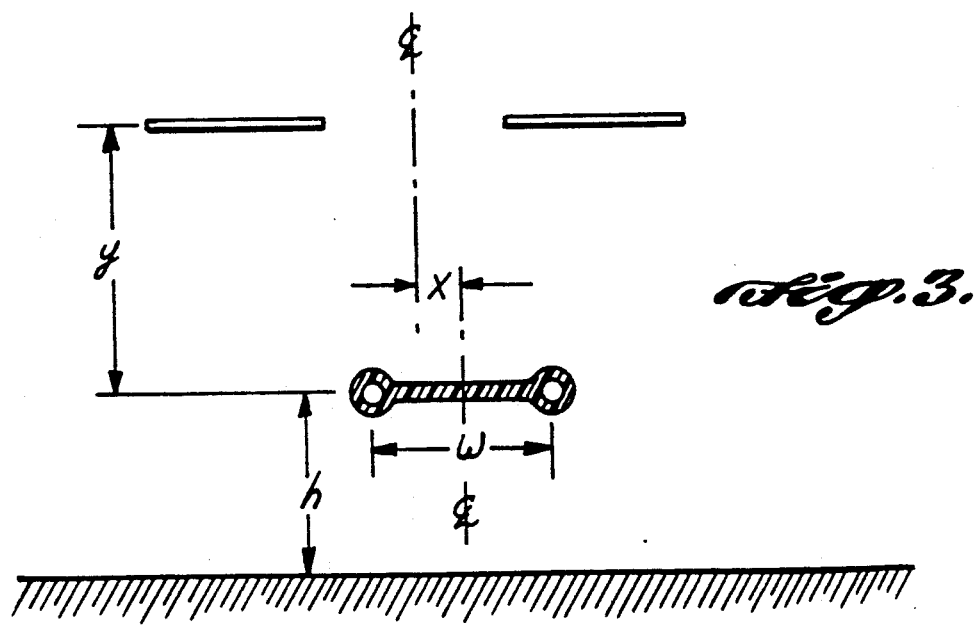
FIG. 3 is an elevational view of the U-shaped coupler illustrated in FIG. 2.

The balanced transmission line 25 terminates in a characteristic impedance 53, which may be coupled to the end of the balanced transmission line 25 via an impedance matching transformer 55, if desired. In addition to the U-shape of the coupler, critical parameters in the design of a broadband, inductively coupled, duplex, RF transmission system formed in accordance with the invention are the physical and electrical relationships between the balanced transmission line, the U-shaped couplers, and the metal structure of the aircraft. FIGS. 2 and 3 illustrate how a transmission line and U-shaped couplers formed in accordance with the invention should be mounted in an aircraft. The mounting arrangement is best described using certain mathematical relationships, set forth next.

The characteristic impedance of a balanced transmission line is defined by the following equation:

$$Z_i = 120 \ln \left( \frac{2W}{d} \cdot \frac{1}{\sqrt{1 + \left(\frac{W}{2h}\right)^2}} \right) \quad (1)$$

where, as shown in FIG. 3:
$Z_i$ is the characteristic impedance of the balanced transmission line
W is the spacing between conductor centers of the balanced transmission line
d is the diameter of the balanced transmission line wire
h is the vertical distance between a ground plane and the centers of the balanced transmission line wires The inductance of a single strip of copper at high frequencies can be defined by the following equation:

$$L = \frac{\mu_o}{2\pi} \left( l \cdot \ln \frac{4l}{w+t} - l + \frac{2}{\pi} w \right) \quad (2)$$

where:
$\mu_o$ is the permeability of free space
l is the length of the strip
w is the width of the strip
t is the thickness of the strip Provided l is much greater than d, the mutual inductance between two identical parallel conductor strips can be defined by the following equation:

$$M = \frac{\mu_o}{2\pi} \left( l \cdot \ln \frac{2l}{D} - l \right) \quad (3)$$

where:
$\mu_o$ is again the permeability of free space
l is the length of the strips
D is the separation of the strips
ln indicates the natural logarithm The high frequency self-inductance of a flat, rectangular printed circuit coil can be defined by the following equation:

$$L_s = \mu_o \left\{ n^2 \left[ s_1 \ln \left( \frac{2s_1 s_2}{nD(s_1+g)} \right) + s_2 \ln \left( \frac{2s_1 s_2}{nD(s_2+g)} \right) + 2g - \frac{1}{2}(s_1+s_2) + .447nD \right] + n(s_1+s_2) \left[ \ln \left( \frac{D}{b+c} \right) - .336 \left( \frac{n-1}{n+1} \right) - .114 \right] \right\} \quad (4)$$

where:
$\mu_o$ is again the permeability of free space
$s_1$ is the average width of the loops in the x direction
$s_2$ is the average width of the loops in the y direction
g is the square root of $s_1^2 + s_2^2$
b is the width of the turn traces
c is the thickness of the turn traces
n is the number of turns The mutual inductance between a flat, rectangular coil and a parallel wire transmission line, including the effects of a nearby conducting ground plane can be defined by the following equation:

$$M = \frac{\mu_o}{2\pi} \sum_{j=1}^{n} q_i \left\{ \ln \left[ \frac{y^2 + \left(p_j + \frac{1}{2}W - x\right)^2}{y^2 + \left(p_j - \frac{1}{2}W + x\right)^2} \right] \cdot \frac{y^2 + \left(p_j + \frac{1}{2}W + x\right)^2}{y^2 + \left(p_j + \frac{1}{2}W - x\right)^2} - \ln \left[ \frac{(y+2h)^2 + \left(p_j + \frac{1}{2}W - x\right)^2}{(y+2h)^2 + \left(p_j - \frac{1}{2}W + x\right)^2} \right] \right. \quad (5)$$

-continued $$\left. \frac{(y + 2h)^2 + \left(p_j + \frac{1}{2} W + x\right)^2}{(y + 2h)^2 + \left(p_j - \frac{1}{2} W - x\right)^2} \right] \right\}$$

where, as shown in FIG. 3:

$\mu_o$ is again permeability of free space q is ½ the length of the loops in one direction p is ½ the length of the loops in the other direction (centerline to centerline)

W is the spacing between the conductor centers of the parallel wire transmission line y is the vertical distance between the flat, rectangular coil and the parallel wire transmission line x is the offset between the centerline between the flat, rectangular coil and the parallel wire transmission line h is the distance between the wire transmission line and the nearby conducting ground plane ln indicates the natural logarithm The transfer characteristics between a parallel wire transmission line and a coupler coil is:

$$G = \frac{Z_o}{Z_i} \left( \frac{R_p}{R_p + Z_o} \cdot \frac{M}{L_s} \right)^2 \cdot \frac{\omega^2 L_s^2}{R_L^2 + \left(\omega L_s + \frac{1}{\omega C_o}\right)^2} \quad (6)$$

where:

G is the transfer characteristic $Z_o$ is the series impedance of the unbalanced transmission line, which is known $R_p$ is the parallel resistance of the impedance matching network, which is known $\omega$ is the angular frequency in radians per second $C_o$ is the series capacitance of the impedance matching network, which is known M is the mutual inductance defined by Equation (5)

$L_s$ is the inductance of a flat, rectangular coil defined by Equation (4)

Figure 4:
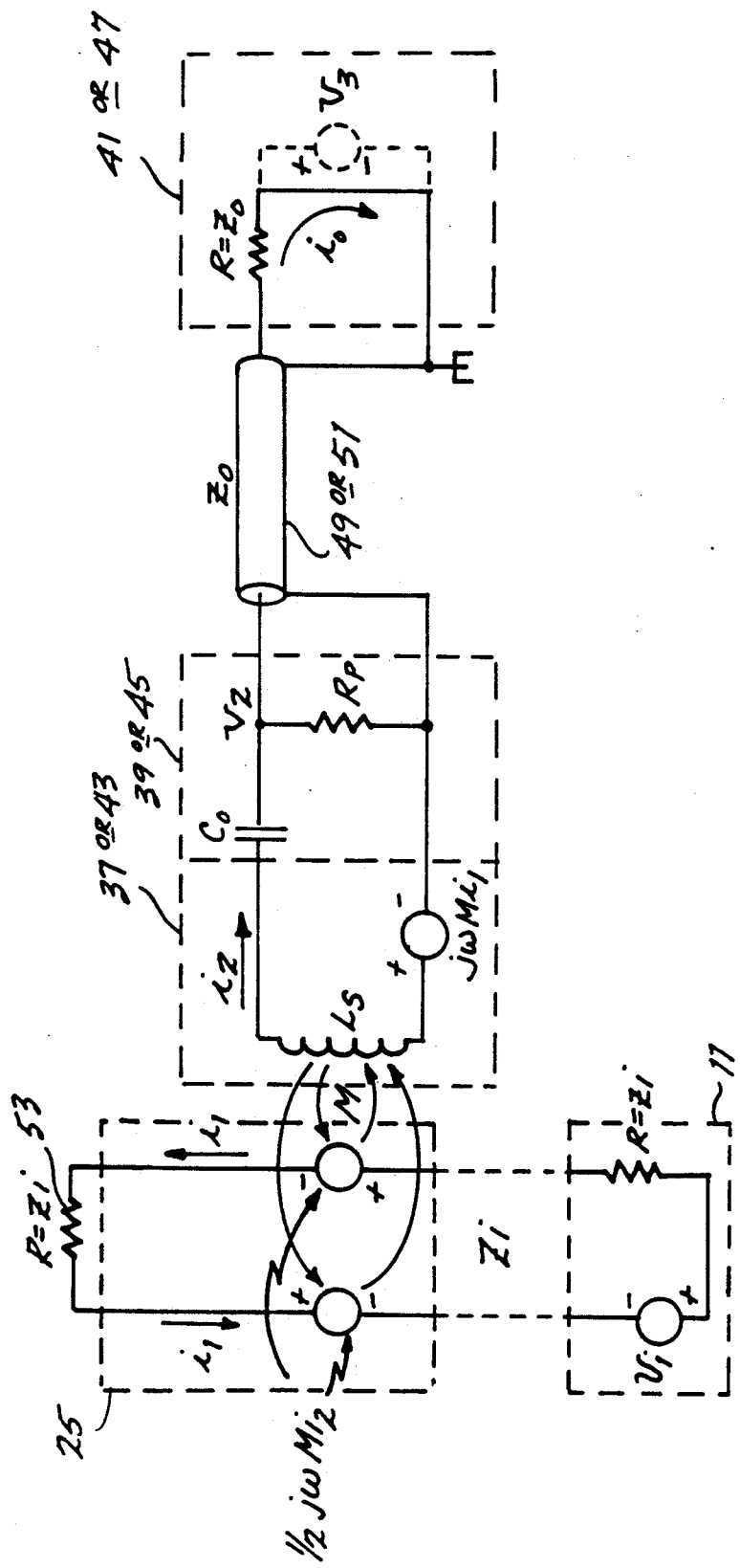
FIG. 4 is a schematic diagram of an equivalent circuit of the major components of a broadband, inductively coupled, duplex, RF transmission system formed in accordance with the invention, namely, a balanced transmission line coupled to a U-shaped transmit or receive coupler.

$Z_i$ is the characteristic impedance of the parallel wire (balanced) transmission line See FIG. 4 which, for ease of illustration, does not include the circuitry coupling the RF signal source 11 to the balanced transmission line 25 or the RF receiver 21.

The circuit illustrated in FIG. 4 has an optimally flat frequency response if for a given $R_p$ and $Z_o$, and for an $L_s$ value determined by Equation (4) the series capacitance, $C_o$, of the impedance matching network can be defined by the following equation:

$$C_o = \frac{2L_s}{\left(\frac{R_p Z_o}{R_p + Z_o}\right)^2} \quad (7)$$

As will be readily appreciated from the foregoing description, the invention provides a broadband, inductively coupled, duplex, RF transmission system suitable for communicating between a central unit and a plurality of remote units. Preferably, the central unit includes an RF signal source and an RF receiver. In any event, the central unit is connected to one end of a balanced transmission line, preferably via a signal splitter and a transmission line impedance matching network. Each remote unit includes a receiving section and a transmitting section separate from one another. Each receiving section and each transmitting section includes a U-shaped coupler position so as to overlie the balanced transmission line, in close proximity thereto. The U-shaped couplers are oriented such that the cross-members of the U-shaped couplers lie orthogonal to the balanced transmission line and the legs of the U-shaped couplers lie parallel to the balanced transmission line. The legs of the U-shaped couplers are connected to electronic transmit and receive sections, via impedance matching networks. The U-shaped couplers are formed of flat, rectangular, conductor strips having a U shape, i.e., a pair of parallel legs and a cross-member.

A transmission system formed in accordance with the invention is highly efficient due to the tight signal coupling between the U-shaped couplers and the balanced transmission line. The balanced configuration of the transmission line minimizes the effect of interfering radio frequency signals from other sources and maintains the quality of the transmitted and received signals high. High efficiency allows the radio frequency fields radiating from the system to be of relatively low intensity, causing minimal radio interference with other electronic equipment.

While a preferred embodiment of the invention has been illustrated and described, it is to be understood that, within the scope of the appended claims, various changes can be made therein.

The embodiments of the invention in which an exclusive property or privilege is claimed are defined as follows:

1. A broadband, inductively coupled, duplex, RF transmission system comprising:

a central RF communication unit for transmitting and receiving RF signals;

a balanced transmission line, said balanced transmission line including a pair of parallel, spaced-apart wires coupled to said central RF communication unit; and at least one remote unit, said at least one remote unit including a receiving section for receiving RF signals and a transmitting section for transmitting RF signals, each of said transmitting and receiving sections including a U-shaped coupler and other elements, said U-shaped couplers positioned so as to overlie the pair of parallel, spaced-apart wires of said balanced transmission line, in close proximity to both wires of the balanced transmission line, said U-shaped couplers being oriented such that the cross-members of said U-shaped couplers lie orthogonal to the longitudinal axis of said pair of parallel, spaced-apart wires and such that the legs of said U-shaped couplers lie generally parallel to said pair of parallel, spaced apart wires, the legs of each of said U-shaped couplers being electrically connected to other elements of the receiving and transmitting section that includes said U-shaped coupler.

2. A broadband, inductively coupled, duplex, RF transmission system as claimed in claim 1, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

3. A broadband, inductively coupled, duplex, RF transmission system as claimed in claim 1, wherein said central RF communication unit includes:
   an RF signal source;
   an RF receiver;
   a signal splitter coupled to said RF signal source and said RF receiver; and
   a transmission line impedance matching network for coupling said signal splitter to one end of said balanced transmission line.

4. A broadband, inductively coupled, duplex, RF transmission system as claimed in claim 3, wherein said U-shaped coupler are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

5. A broadband, inductively coupled, duplex, RF transmission system as claimed in claim 3, wherein said signal splitter is coupled to said transmission line impedance matching network by an unbalanced transmission line impedance matching network by an unbalanced transmission line and wherein said transmission line impedance matching network converts unbalanced signals carried by said unbalanced transmission line into balanced signals and vice versa.

6. A broadband, inductively coupled, duplex, RF transmission system as claimed in claim 5, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

7. A broadband, inductively coupled, duplex, RF transmission system as claimed in claim 5, wherein said other elements of each of said receiving sections includes:
   an RF receiver; and
   a receiver loop impedance matching network for coupling a U-shaped coupler to said RF receiver.

8. A broadband, inductively coupled, duplex, RF transmission system as claimed in claim 7, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

9. A broadband, inductively coupled, duplex, RF transmission system as claimed in claim 7, wherein said RF receiver is connected to said receiver loop impedance matching network by an unbalanced transmission line and wherein said receiver loop impedance matching network converts balanced signals picked up by a U-shaped coupler into unbalanced signals suitable for transmission over said unbalanced transmission line.

10. A broadband, inductively coupled, duplex, RF transmission system as claimed in claim 9, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

11. A broadband, inductively coupled, duplex, RF transmission system as claimed in claim 5, wherein said other elements of each of said transmitting sections includes:
   an RF signal source; and
   a transmit loop impedance matching network for coupling said RF signal source to a U-shaped coupler.

12. A broadband, inductively coupled, duplex, RF transmission system as claimed in claim 11, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

13. A broadband, inductively coupled, duplex, RF transmission system as claimed in claim 11, wherein said RF signal source is connected to said transmit loop impedance matching network via an unbalanced transmission line and wherein said transit loop impedance matching network converts unbalanced signals carried by said unbalanced transmission line into balanced signals prior to the application of said signals to said U-shaped coupler.

14. A broadband, inductively coupled, duplex, RF transmission system as claimed in claim 13, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

15. A broadband, inductively coupled, duplex, RF transmission system as claimed in claim 1, wherein said other elements of each of said receiving sections includes:
   an RF receiver; and
   a receiver loop impedance matching network for coupling a U-shaped coupler to said RF receiver.

16. A broadband, inductively coupled, duplex, RF transmission system as claimed in claim 15, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

17. A broadband, inductively coupled, duplex, RF transmission system as claimed in claim 15, wherein said RF receiver is connected to said receiver loop impedance matching network by an unbalanced transmission line and wherein said receiver loop impedance matching network converts balanced signals picked up by a U-shaped coupler into unbalanced signals suitable for transmission over said unbalanced transmission line.

18. A broadband, inductively coupled, duplex, RF transmission system as claimed in claim 17, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

19. A broadband, inductively coupled, duplex, RF transmission system as claimed in claim 1, wherein said other elements of each of said transmitting sections includes:
   an RF signal source; and
   a transmit loop impedance matching network for coupling said RF signal source to a U-shaped coupler.

20. A broadband, inductively coupled, duplex, RF transmission system as claimed in claim 19, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

21. A broadband, inductively coupled, duplex, RF transmission system as claimed in claim 19, wherein said RF signal source is connected to said transmit loop impedance matching network via an unbalanced transmission line and wherein said transmit loop impedance matching network converts unbalanced signals carried by said unbalanced transmission line into balanced signals prior to the application of said signals to said U-shaped coupler.

22. A broadband, inductively coupled, duplex, RF transmission system as claimed in claim 21, wherein said U-shaped couplers are formed of a thin, flat piece of metal having a rectangular shape and include a pair of elongate parallel legs and a cross-member unitarily formed with said pair of elongate parallel legs and lying orthogonal thereto, the longitudinal axis of said elongate parallel legs lying parallel to said pair of parallel, spaced-apart wires.

* * * * *

UNITED STATES PATENT AND TRADEMARK OFFICE
CERTIFICATE OF CORRECTION

PATENT NO. : 5,084,864
DATED : January 28, 1992
INVENTOR(S) : T.H. Turnbull et al.

It is certified that error appears in the above-identified patent and that said Letters Patent is hereby corrected as shown below:

| COLUMN | LINE | |
|---|---|---|
| 1 | 7 | "ratio" should read --radio-- |
| 6 | 4 | after "much" insert --much-- |
| 9 | 15 | "coupler" should read --couplers-- |
| 9 | 26 & 27 | after "line" delete "impedance matching network by an unbalanced transmission line" |
| 10 | 26 | "transit" should read --transmit-- |

Signed and Sealed this

Twenty-fifth Day of May, 1993

Attest:

MICHAEL K. KIRK

*Attesting Officer*      Acting Commissioner of Patents and Trademarks